(12) United States Patent
Inui et al.

(10) Patent No.: US 6,932,880 B2
(45) Date of Patent: Aug. 23, 2005

(54) METHOD OF MANUFACTURING OPTICAL WAVEGUIDE DEVICE

(75) Inventors: Yukitoshi Inui, Nishikasugai-gun (JP); Kuniyoshi Kondo, Nishikasugai-gun (JP); Manabu Kagami, Aichi-gun (JP); Tatsuya Yamashita, Aichi-gun (JP); Akari Kawasaki, Aichi-gun (JP); Hiroshi Ito, Aichi-gun (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 284 days.

(21) Appl. No.: 10/166,378

(22) Filed: Jun. 11, 2002

(65) Prior Publication Data

US 2002/0186935 A1 Dec. 12, 2002

(30) Foreign Application Priority Data

Jun. 12, 2001 (JP) ..................................... P2001-177650

(51) Int. Cl.[7] ................................................ G02B 6/26
(52) U.S. Cl. ...................... 156/272.2; 385/39; 385/147; 430/321; 430/394
(58) Field of Search .......................... 156/272.2, 272.8; 430/321, 394; 385/123, 147, 39, 127, 136

(56) References Cited

U.S. PATENT DOCUMENTS 6,703,188 B1 * 3/2004 Kagami et al. ............. 430/321

6,823,116 B2 * 11/2004 Inui et al. ..................... 385/39
2003/0031414 A1 * 2/2003 Inui et al. ..................... 385/39

FOREIGN PATENT DOCUMENTS

| GB | 2 143 650 A | 2/1985 |
| JP | 04-165311 | 6/1992 |
| JP | 2000-147291 | 5/2000 |
| WO | WO 96/42036 | 12/1996 |

* cited by examiner

*Primary Examiner*—John T. Haran
(74) *Attorney, Agent, or Firm*—McGinn & Gibb, PLLC

(57) ABSTRACT

Transparent parallel planar plates which are members for retaining an optical waveguide are provided erectly in an optical path of light in a transparent vessel in advance. An optical fiber is fixed into the transparent vessel while the optical fiber penetrates the transparent vessel, and an optical sensor is also disposed adjustably. Next, a first photo-curable resin solution is injected into the transparent vessel, and light with a predetermined wavelength for curing is emitted from the optical fiber so that the optical waveguide is self-formed by polymerization reaction. Because the parallel planar plates are transparent, the optical waveguide is formed so as to be extended again from the emission ports of the parallel planar plates. Finally, the optical waveguide is formed so as to reach a bottom surface of the transparent vessel. The optical waveguide has a structure in which the optical waveguide is firmly supported at four points in a forward end surface of the optical fiber, the parallel planar plates and the bottom surface of the transparent vessel. Accordingly, a firm optical waveguide device is formed.

19 Claims, 3 Drawing Sheets

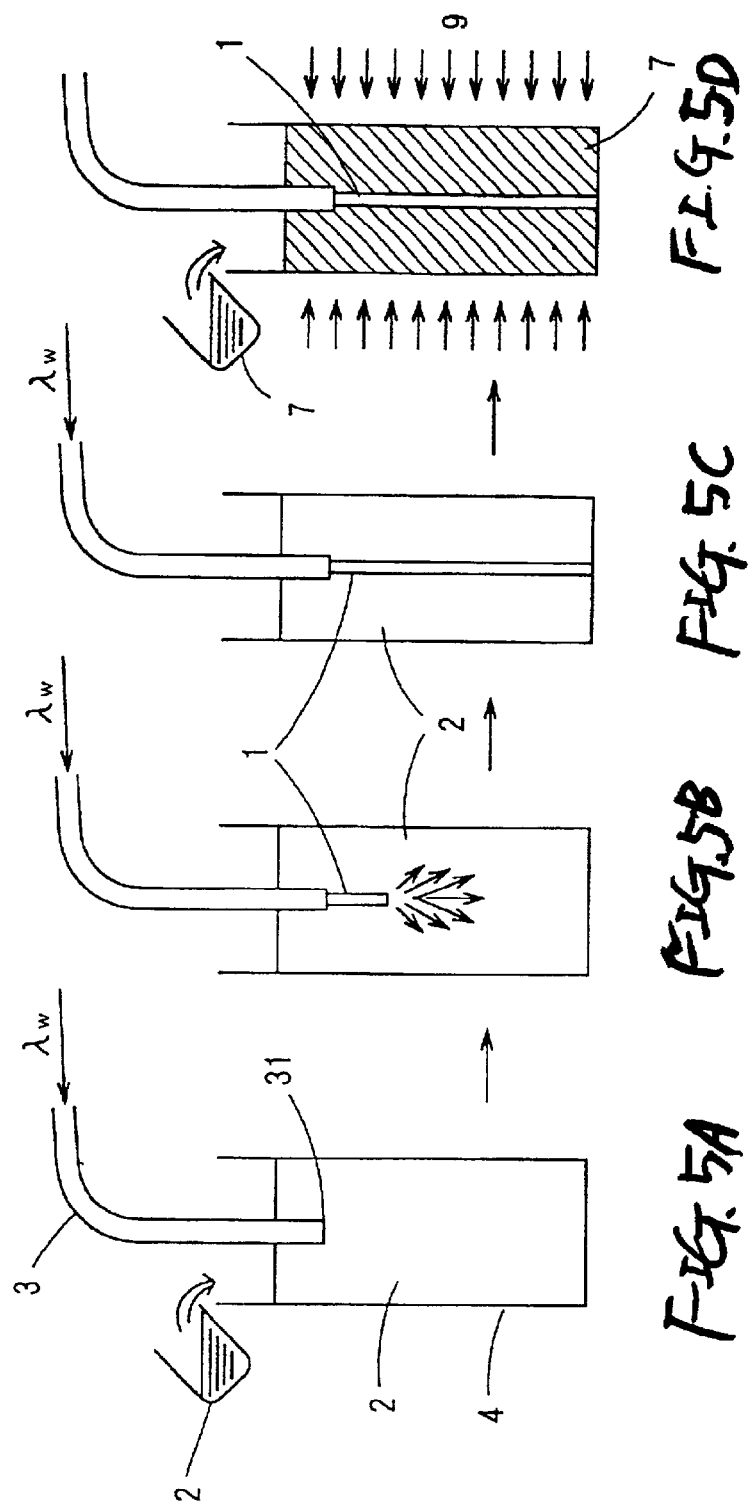

METHOD OF MANUFACTURING OPTICAL WAVEGUIDE DEVICE

The present application is based on Japanese Patent Application No. 2001-177650, which is incorporated herein by reference.

BACKGROUND OF THE INVENTION

1. Field of the Invention

The present invention relates to a method of manufacturing an optical waveguide device by use of photo-curable resin solutions and light. Particularly, it relates to a method of manufacturing a firm optical waveguide device having an optical waveguide retained by a retention member including an optical component. This invention is applicable to an optical waveguide device inexpensive in cost and low in loss in optical fiber communication, such as an optical transmitter/receiver, an optical interconnection, an optical demultiplexer or an optical multiplexer.

2. Description of the Related Art

A technique using a photo-curable resin solution for forming an optical waveguide at a forward end of an optical fiber has been noticed in recent years. For example, Unexamined Japanese Patent Publication No. Hei. 4-165311 has disclosed a method of manufacturing an optical waveguide. To give a brief description, the method has a first step of immersing an end of an optical fiber in a photo-curable resin solution, for example, made of a fluorine-based monomer, and a second step of emitting light of a wavelength from the forward end of the optical fiber to thereby cure the solution with the light.

For example, when laser light of a wavelength near an ultraviolet range or of a short wavelength is emitted from the end portion of the optical fiber, the photo-curable resin solution at the forward end portion of the optical fiber is cured by photopolymerization reaction. From the emitting end, there is formed a so-called core portion based on the power distribution of the light. When the core portion is formed, the light is propagated further forward and forms another core portion continuously and successively. As a result, an optical waveguide is formed.

The method has a third step of extracting the thus formed optical waveguide from the photo-curable resin solution and removing the remaining photo-curable resin solution by cleaning or the like. The method further has a fourth step of coating the optical waveguide with a light-transmissive resin. This step is performed for covering the core surface and protecting the core surface from being contaminated with dust or from being damaged.

In the related-art example, however, the end surface of the optical waveguide formed thus was not an optical surface. For this reason, it was necessary to provide a fifth step as the final step of cutting and polishing the forward end surface of the thus formed core portion to thereby form an emitting surface of the optical waveguide. Further, in the related-art example, the formed core portion ceased at a transmission line length of 8.5 mm. When surface treatment was subjected to the end surface of the core portion, the transmission line length was further reduced. Although this reduced transmission line length was applicable to a connector for connecting optical fibers to each other, this length was difficult to form an optical waveguide device such as a demultiplexer/multiplexer having a branching mirror inserted in the middle of the transmission line.

Further, in the third step, when the formed optical waveguide was extracted from the photo-curable resin solution, the optical waveguide was bent, so that there arose a problem in coupling the optical waveguide with another optical component.

SUMMARY OF THE INVENTION

In order to solve the problems, an object of the invention is to couple opposite ends of an optical waveguide formed by curing of a photo-curable resin solution, to a box of an optical waveguide device to ensure linearity and fixation characteristic of the optical waveguide in the steps of removing the photo-curable resin solution and cleaning the cured optical waveguide to thereby facilitate execution of the steps.

Another object of the invention is to provide a method of manufacturing a firm optical waveguide device by the simple steps of preparing a box having an optical component as a retention member and an end portion of an optical fiber formed therein, filling the box with a photo-curable resin solution, and emitting light of a predetermined wavelength from the optical fiber.

A further object of the invention is to optionally and independently select a photo-curable resin solution for forming a core portion of an optical waveguide and a resin liquid for forming a clad portion of the optical waveguide to thereby make a large difference between refractive indices of the core portion and the clad portion.

A further object of the invention is to provide a method of manufacturing various optical waveguide devices with low transmission loss by increasing the refractive index difference.

A still further object of the invention is to provide a method of manufacturing an inexpensive optical waveguide greatly reduced in assembling cost and component cost.

The invention does not mean that all these objects have to be achieved collectively and simultaneously but means that these objects may be achieved individually and separately.

(1) According to the invention, there is provided a method of manufacturing an optical waveguide device provided with an optical waveguide, the optical waveguide being continuously formed by curing a first photo-curable resin liquid in a direction of an optical axis with light of a predetermined wavelength guided into the first photo-curable resin liquid, wherein the method includes the steps of: preparing an optical fiber for guiding the light into a box of the optical waveguide device filled with the first photo-curable resin liquid, and fixing the optical fiber to the box; curing the first photo-curable resin liquid along an optical path of the light by the light outputted from the optical fiber, and making a forward end of the optical path abut on the box to thereby fix a forward end of the cured optical waveguide to the box; thereafter, removing the first photo-curable resin liquid from the box; and filling the box with a second photo-curable resin liquid, and curing the second photo-curable resin liquid so that the cured second photo-curable resin liquid has a refractive index lower than that of the cured optical waveguide.

(2) Further, according to the invention, there is provided a method of manufacturing an optical waveguide device which is the method of manufacturing an optical waveguide device as defined in (1), where in at least one retention member transparent or reflective to the light is provided in the box in a state that the retention member is fixed to the box, so that the optical waveguide is bonded to the retention member when the first photo-curable resin liquid is cured.

(3) Further, according to the invention, there is provided a method of manufacturing an optical waveguide device which is the method of manufacturing an optical waveguide device as defined in (1) or (2), wherein the light is guided through the optical fiber fixed to the box, so that when the optical fiber is fixed externally onto the box, the optical waveguide is formed so as to be continued from an inner wall of the box corresponding to the forward end of the optical fiber, and so that when the optical fiber is fixed into the box while the optical fiber penetrates the box, the optical waveguide is formed so as to be continued from the forward end of the optical fiber.

(4) Further, according to the invention, there is provided a method of manufacturing an optical waveguide device which is the method of manufacturing an optical waveguide device as defined in any one of (1) through (3), wherein the first photo-curable resin liquid is a resin liquid which has an adhesive property to the box when the first photo-curable resin liquid is cured.

(5) Further, according to the invention, there is provided a method of manufacturing an optical waveguide device which is the method of manufacturing an optical waveguide device as defined in (2), wherein the first photo-curable resin liquid is a resin liquid having an adhesive property to the retention member when the first photo-curable resin liquid is cured.

(6) Further, according to the invention, there is provided a method of manufacturing an optical waveguide device which is the method of manufacturing an optical waveguide device as defined in any one of (1) through (5), wherein the second photo-curable resin liquid is a resin liquid having an adhesive property to the box when the second photo-curable resin liquid is cured.

(7) Further, according to the invention, there is provided a method of manufacturing an optical waveguide device which is the method of manufacturing an optical waveguide device as defined in any one of (1) through (6), wherein the second photo-curable resin liquid has an adhesive property to the first photo-curable resin which is cured.

(8) Further, according to the invention, there is provided a method of manufacturing an optical waveguide device which is the method of manufacturing an optical waveguide device as defined in any one of (1) through (7), wherein the second photo-curable resin liquid is mutually soluble in the first photo-curable resin liquid.

(9) Further, according to the invention, there is provided a method of manufacturing an optical waveguide device which is the method of manufacturing an optical waveguide device as defined in any one of (1) through (8), wherein the second photo-curable resin liquid is either of a photo-curable resin and a heat-curable resin.

In the method of manufacturing an optical waveguide device as in (1), the box into which the optical fiber for guiding light is fixed is filled with the first photo-curable resin liquid, and the light is outputted from the optical fiber so that the first photo-curable resin liquid is cured along the optical path of the light. Then, the forward end of the optical path is cured while made to abut on the box, so that the forward end of the optical waveguide is coupled and fixed to the box. Thereafter, the first photo-curable resin liquid is removed from the box, and the box is filled with the second photo-curable resin liquid having a refractive index lower than that of the optical waveguide when both the second photo-curable resin liquid and the optical waveguide are cured. Finally, the second photo-curable resin liquid is solidified, for example, by ultraviolet rays.

The optical fiber is fixed to the box, and the forward end of the optical waveguide extended from the end surface of the optical fiber is also fixed to the box by photo-curing. That is, according to the invention, opposite ends of the optical waveguide are always fixed. On this occasion, for example, when an optical element is provided in the inside or outside of the box and at the forward end of the optical waveguide, the positional relation between the optical fiber and the optical element is fixed by the optical waveguide. That is, a firm optical waveguide device which is not affected by disturbance such as vibration can be formed. Further, in this method, after cured, the first photo-curable resin liquid is removed, and the second photo-curable resin liquid is charged and solidified. That is, the second photo-curable resin liquid can be selected in accordance with the refractive index of the first photo-curable resin liquid which is cured. That is, for example, a second photo-curable resin liquid having a refractive index sufficient to form a step-index optical waveguide with low loss can be selected optionally. That is, a firm optical waveguide device with low loss can be manufactured. In addition, since the opposite ends of the optical waveguide are fixed to the box, the thin optical waveguide is supported by the box both in the step of removing the first photo-curable resin liquid and the step of cleaning the first photo-curable resin liquid thereafter in accordance with necessity. Accordingly, these steps can be carried out easily with no fear of separation or bending of the optical waveguide. Incidentally, the cleaning step, as will be described later, is a step not always needed.

The method of manufacturing an optical waveguide device as in (2) is the method of manufacturing an optical waveguide device defined in (1), wherein at least one retention member transparent or reflective to the light is provided in the box in a state that the retention member is fixed to the box, so that the optical waveguide is bonded to the retention member when the first photo-curable resin liquid is cured.

This configuration is effective in the case where the optical waveguide is long. For example, in the method of manufacturing an optical waveguide device as defined in (1), when the optical waveguide is long, that is, when the optical waveguide is long at the point of time that the first photo-curable resin liquid is cured, there may occur a case where external force is applied to fixed points of the opposite ends of the optical waveguide so that the optical waveguide is separated from the box or the linearity of the optical waveguide cannot be retained. For example, when the solution is exchanged for the second photo-curable resin liquid, there may be a case where large fluid resistance is applied on the optical waveguide to separate or bend the optical waveguide.

According to the invention, in order to prevent this disadvantage, at least one retention member transparent or reflective to the light is provided in the middle of the optical path of light in the state that the retention member is fixed to the box. That is, the optical waveguide is fixed at any desired place of the optical path as well as at the opposite ends. Accordingly, a firmer optical waveguide device can be formed. Incidentally, examples of the retention member include a transparent glass plate, a filter, and a mirror. On this occasion, it is a matter of course that the retention member used may also serve as an optical component. In such a manner, a method of manufacturing an optical waveguide device good in utilization efficiency is established.

The method of manufacturing an optical waveguide device as in (3) is the method of manufacturing an optical waveguide device defined in (1) or (2), wherein the light is guided through the optical fiber fixed to the box, so that when the optical fiber is fixed externally onto the box, the optical waveguide is formed so as to be continued from an inner wall of the box corresponding to the forward end of the optical fiber, and so that when the optical fiber is fixed into the box while the optical fiber penetrates the box, the optical waveguide is formed so as to be continued from the forward end of the optical fiber.

In the case where the optical fiber is fixed externally onto the box, the box is formed from a material such as glass which is transparent both to the light used for curing of a resin liquid and to the light practically used in the optical waveguide. The light emitted from the optical fiber is transmitted through the box, so that photo-polymerization reaction is caused successively in the direction of the optical axis from the transmitted place. That is, the optical fiber is bonded to the transmitted place, so that an optical waveguide is formed axially so as to be continued from the transmitted place.

Further, when the optical fiber is fixed into the box while the optical fiber penetrates the box, the box is formed from an opaque material such as metal. In this case, the optical waveguide is formed so as to be continued from the forward end of the optical fiber. At this time, the opposite ends of the optical waveguide are fixed to the box regardless of the material of the box. Hence, a firm optical waveguide device can be also manufactured according to the invention.

Further, when the optical fiber is used, the optical waveguide is formed to be bonded to the core portion of the optical fiber. Accordingly, it is unnecessary to axially align the optical waveguide with the optical fiber. Hence, there can be achieved an optical waveguide device which is integrated with the optical fiber so that the optical waveguide device is firm and highly convenient. Incidentally, in this method, the optical fiber may be a step-index optical fiber or a graded-index optical fiber. In short, the optical waveguide is formed from the core portion of the step-index or graded-index optical fiber.

Further, the method of manufacturing an optical waveguide device as in (4) is the method of manufacturing an optical waveguide device defined in any one of (1) to (3), wherein the first photo-curable resin liquid has an adhesive property to the box when the first photo-curable resin liquid is cured.

For example, as a method for enhancing the adhesive property (conglutinative property) of the photo-curable resin, a silane coupling agent (an alkoxyl group-containing polymer formed from polysiloxane containing an acrylic group, an amino group, an isocyanate group, a vinyl group, or the like, added onto silane of the polysiloxane) is generally added into the photo-curable resin. If the silane coupling agent is added in accordance with the material of the box, the adhesive property of the photo-curable resin to the box can be enhanced when the resin is cured. The adhesive property of the photo-curable resin to the box permits the optical waveguide to be firmly bonded to the box when the first photo-curable resin liquid is cured. When, for example, the box is made of a glass vessel, and a laser beam of a short wavelength is guided into the box, the optical waveguide is formed as an optical waveguide firmly bonded to the box. Accordingly, a firmer optical waveguide can be formed.

The method of manufacturing an optical waveguide device as in (5) is the method of manufacturing an optical waveguide device defined in (2), wherein a resin liquid exhibiting an adhesive property to the retention member when cured is used as the first photo-curable resin liquid.

The retention member is a reflecting plate. For example, the reflecting plate is made of a parallel planar plate (window glass) of a glass material, a plate of a metal material such as aluminum, gold, silver or copper, or a glass or ceramic plate containing any one of those metals deposited on a surface of the glass or ceramic plate. As a method for enhancing the adhesive property (conglutinative property) to the retention member, there is a method in which a silane coupling agent (an alkoxyl group-containing polymer formed from polysiloxane containing an acrylic group, an amino group, an isocyanate group, a vinyl group, or the like, added on to silane of the polysiloxane) is added into the first photo-curable resin. Further, the silane coupling agent or a primer (urethane-based or epoxy-based) may be applied onto the surface of the retention member. In such a manner, the adhesive property of the optical waveguide to the retention member is enhanced.

When, for example, a laser beam of a short wavelength is guided into the retention member through the box in the state that such an additive is applied on to the surface of the retention member, or in the state that such an additive is added into the first photo-curable resin liquid, an optical waveguide bonded firmly to the retention member can be formed. In such a manner, the optical waveguide can be formed as an optical waveguide firmly bonded to the retention member in the middle of the optical path of light.

Further, the method of manufacturing an optical waveguide device as in (6) is the method of manufacturing an optical waveguide device defined in any one of (1) to (5), wherein a resin liquid exhibiting an adhesive property to the box when cured is used as the second photo-curable resin liquid.

Accordingly, the second photo-curable resin liquid is firmly bonded to the box when cured. If the second photo-curable resin liquid in the surroundings of the optical waveguide is not firmly bonded to the box when cured, force may be applied on the optical waveguide due to impact, vibration, etc. According to the invention, since the second photo-curable resin liquid is firmly bonded to the box, there is no fear that force is applied on the optical waveguide. On the contrary, the second photo-curable resin liquid can protect the optical waveguide.

Incidentally, an additive may be added into the second photo-curable resin in order to improve the adhesive property. The additive may be the same as the additive added into the first photo-curable resin liquid.

Further, the method of manufacturing an optical waveguide device as in (7) is the method of manufacturing an optical waveguide device defined in any one of (1) to (6), wherein a resin liquid exhibiting an adhesive property to the first photo-curable resin when cured is used as the second photo-curable resin liquid. Accordingly, the optical waveguide can be protected steadily. Incidentally, on this occasion, the second photo-curable resin liquid, preferably, exhibits an adhesive property to the box, so that the optical waveguide can be protected more steadily from disturbance such as impact.

Incidentally, an additive may be added on this occasion in order to improve the adhesive property. Any additive may be used if the additive can be bonded to the optical waveguide well. Of course, an additive which can improve the adhesive property both to the box and to the optical waveguide is preferred.

Further, the method of manufacturing an optical waveguide device as in (8) is the method of manufacturing an optical waveguide device defined in any one of (1) to (7), wherein a resin liquid exhibiting mutual solubility in the first photo-curable resin liquid is used as the second photo-curable resin liquid.

In the case where the optical waveguide is formed from the first photo-curable resin liquid, the first photo-curable resin liquid may remain on the surface of the optical waveguide even after removed. When the second photo-curable resin liquid is injected in this state, the first photo-curable resin liquid remaining on the surface of the optical waveguide is dissolved in the injected second photo-curable resin liquid because the first and second photo-curable resin liquids are mutually soluble in each other. That is, the surface of the optical waveguide becomes substantially uniform. When the surface is uniform, the loss caused by propagation (total reflection) is reduced. That is, an optical waveguide with low loss can be formed.

Further, the cleaning step is normally required after the first photo-curable resin liquid is removed. In the invention, a resin liquid exhibiting mutual solubility is used as the second photo-curable resin liquid. Accordingly, there is an effect that the cleaning step can be omitted.

Further, the method of manufacturing an optical waveguide device as in (9) is the method of manufacturing an optical waveguide device defined in any one of (1) to (8), wherein the second photo-curable resin liquid is either of a photo-curable resin and a heat-curable resin.

When a photo-curable resin is used as the second photo-curable resin liquid, the optical waveguide can be fixed to the box steadily in a short time simply by irradiation with ultraviolet rays from the surroundings. On this occasion, it is preferable that the box is formed from a transparent material such as glass. Ultraviolet rays act on the box so effectively that the second photo-curable resin liquid can be solidified in a short time.

Further, when a heat-curable resin is used as the second photo-curable resin liquid, the optical waveguide can be fixed to the box easily and steadily by a simple operation of heating. On this occasion, any material may be used as the material of the box. The material may be a glass material or a metal material. Any material may be used if the material can withstand heating. Thus, an optical waveguide device can be manufactured inexpensively.

Features and advantages of the invention will be evident from the following detailed description of the preferred embodiments described in conjunction with the attached drawings.

BRIEF DESCRIPTION OF THE DRAWINGS

In the accompanying drawings:

FIGS. 5A to 5D are views showing steps of a method of manufacturing the optical waveguide device according to the first embodiment.

DETAILED DESCRIPTION OF THE PREFERRED EMBODIMENTS

Figure 1:
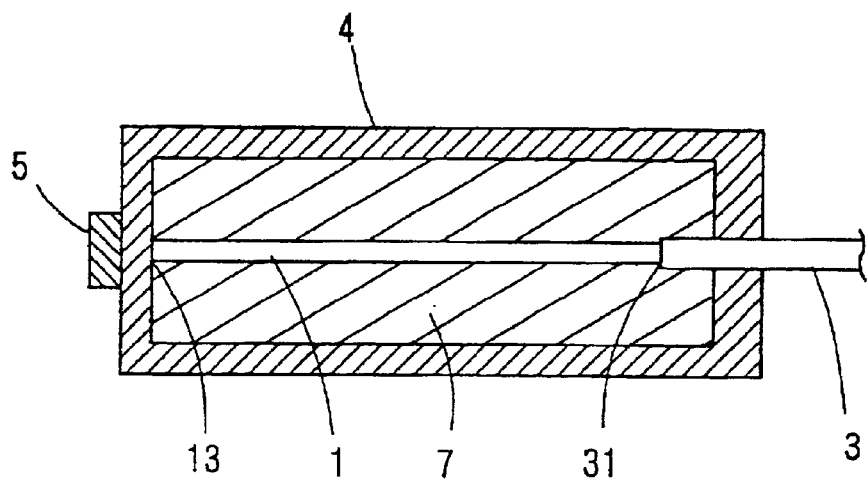
FIG. 1 is a sectional view showing an optically receiving device using an optical waveguide according to a first embodiment.

The invention will be described below in connection with embodiments. Incidentally, the invention is not at all limited to the following embodiments.

(First Embodiment)

First, with reference to FIGS. 5A to 5D, a method of manufacturing a self-forming type optical waveguide device according to the invention is described. The manufacturing method is a so-called laser sculpturing method which does not use any movable portion but uses a photo-curable resin as a liquid monomer and a laser beam of a short wavelength for curing the resin. FIGS. 5A to 5D are views schematically showing the steps. First, in step FIG. 5A, a first photo-curable resin solution 2 (hereinafter, the term "solution" will be used in the embodiments) as an example of the first photo-curable resin liquid is injected into a transparent vessel 4 which is a box, so that an forward end surface 31 of an optical fiber 3 is immersed in the solution.

Next, the process shifts to step FIG. 5B, and a laser beam of a predetermined wavelength such as a short wavelength (wavelength $\lambda_W$) is guided into the optical fiber 3 so as to be emitted from the forward end surface 31. The laser beam of a short wavelength is, for example, an He—Cd (helium-cadmium) laser beam of a wavelength $\lambda_W$=325 nm. By virtue of the emitted light from the forward end surface 31 of the optical fiber, the first photo-curable resin solution 2 is subjected to polymerization reaction so as to be cured. On this occasion, increase in refractive index occurs at the forward end portion due to the curing, so that an optical wavegiude 1 continues to grow while the guided light is confined in the forward end portion. In step FIG. 5C, irradiation through the optical fiber 3 is stopped when this self-forming optical waveguide reaches a bottom surface of the transparent vessel 4. Then, the first photo-curable resin solution 2 is removed from the transparent vessel 4 and cleaned. Next, the process shifts to step FIG. 5D, and in place of the first photo-curable resin solution 2, a second photo-curable resin solution 7 (hereinafter, the term "solution" is employed in the embodiments) as an example of a second photo-curable resin liquid is injected into the transparent vessel 4. Finally, the transparent vessel 4 is irradiated with ultraviolet rays 9, for example, by an ultraviolet lamp. Due to the transparency of the vessel 4, the ultraviolet rays 9 cure and solidify the second photo-curable resin solution 7 as a whole. In this process, a wholly solid optical waveguide device is obtained.

On this occasion, the refractive index of the second photo-curable resin solution 7 cured (the refractive index of the clad) is set to be smaller than that of the first photo-curable resin solution 2 cured (the refractive index of the core). When setting is made in such a manner, a step-index optical waveguide 1 is formed. Because the optical waveguide is of a step-index type, light can be propagated with low loss. Incidentally, in order to minimize the propagation loss of the optical waveguide 1, the second photo-curable resin solution 7 may be selected so that the relative refractive-index difference between the core and the clad of the optical waveguide is larger than that between the core and the clad of the optical fiber. In such a manner, an optical waveguide device with lower loss can be obtained.

By use of this manufacturing method, various optical waveguide devices can be manufactured. FIG. 1 is a sectional view showing an optically receiving device using a self-forming type optical wavegiude. In the manufacturing method in this case, first, while the optical fiber 3 penetrates the transparent vessel 4, the optical fiber 3 is fixed to one end of the transparent vessel 4 which is a box of an optical waveguide device, and then, for example, an optical sensor 5 which is an optical component is provided externally onto the other end of the transparent vessel 4. Then, the manufacturing process shown in the steps FIGS. 5A to 5D is performed. In this manner, the optical waveguide 1 is self-formed so as to be continued from the forward end portion 31 of the optical fiber 3, so that the forward end portion of the optical waveguide abuts on a bottom surface 13 of the transparent vessel 4.

On this occasion, a resin solution having an adhesive property is used as the first photo-curable resin solution 2. The resin solution having an adhesive property is, for example, a photo-curable resin solution containing a silane coupling agent as an additive. Thus, the forward end of the optical waveguide 1 can be firmly bonded to the bottom surface 13 of the transparent vessel 4 which is a box. Further, the other end of the optical waveguide 1 is likewise firmly bonded to the forward end surface 31 of the optical fiber 3 by use of the adhesive property of the first photo-curable resin solution. That is, the optical waveguide 1 is fixed firmly at its opposite ends. By this arrangement, the form of the optical waveguide can be stably maintained also when the first photo-curable resin solution 2 is exchanged for the second photo-curable resin solution 7. That is, the optically receiving device can be manufactured easily. Incidentally, though the description has been made on the case where the optical sensor 5 is used as an optical component, a light emitting element such as a semiconductor laser or an LED may be used, in place of the optical sensor, as an optical component. Further, the optical device can be formed as an optical waveguide type optically transmitting device.

Figure 2:
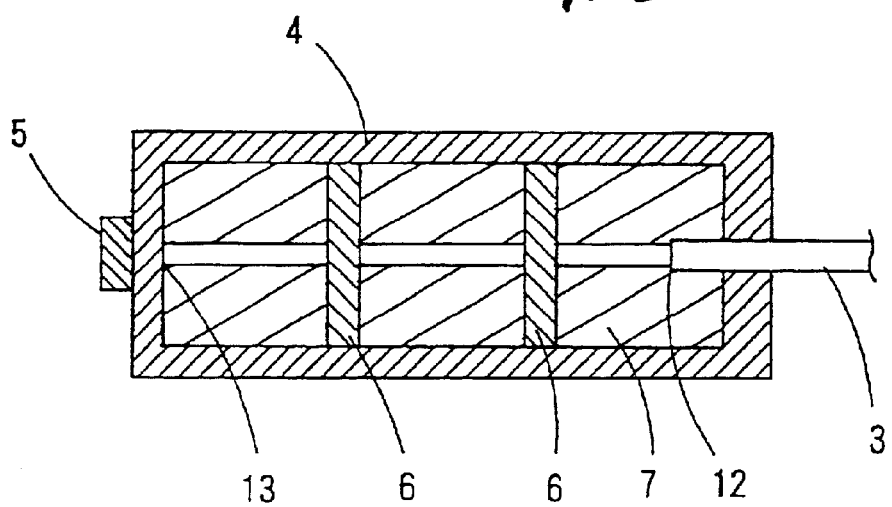
FIG. 2 is a sectional view showing the optically receiving device including retention members according to the first embodiment.

Incidentally, when the optical waveguide device shown in FIG. 1 is long, there may be a case where the optical waveguide device is deformed or the bonded surface of the optical waveguide device is separated at the time of exchanging the first photo-curable resin solution for the second photo-curable resin solution. In this case, it is preferable that parallel planar plates 6 each of which is a retention member made of glass are installed inside the transparent vessel 4 in advance, as shown in FIG. 2.

Because the parallel planar plates 6 arranged thus are transparent, light emitted from the optical fiber 3 is transmitted through the respective parallel planar plates 6 and abuts on the bottom surface 13 of the transparent vessel 4 while the optical waveguide 1 is being formed along the transmission path. That is, the optical waveguide 1 is formed between the forward end portion 12 of the optical fiber and one of the parallel planar plates 6, between the parallel planar plates 6 adjacent to each other and between the other parallel planar plate 6 and the bottom surface 13 of the transparent vessel 4. That is, the optical waveguide 1 is structured to be supported at four points.

Also in this case, the first photo-curable resin solution 2 has an adhesive property because of addition of the silane coupling agent, so that the cured optical waveguide 1 is coupled to the bottom surface 13 and the parallel planar plates 6 so as to be supported firmly at four points. In such a structure, the waveguide can be therefore almost prevented from being separated or being damaged even when the first photo-curable resin solution is exchanged for the second photo-curable resin solution or even when disturbance vibration occurs. That is, the optical waveguide device improved in resistance to disturbance can be formed. By use of such a manufacturing method, a long optical waveguide device can be manufactured. At this time, examples of a method for enhancing the adhesive property (conglutinative property) of the photo-curable resin include: addition of a silane coupling agent (an alkoxyl group-containing polymer formed from polysiloxane containing an acrylic group, an amino group, an isocyanate group, a vinyl group, or the like, added onto silane of the polysiloxane) into the photo-curable resin; and application of the silane coupling agent or a primer (urethane-based, epoxy-based) on the retention member. Any one of these methods may be employed.

Further, the additive is preferably added also into the second photo-curable resin solution 7. When the second photo-curable resin solution 7 is also formed to have an adhesive property, the second photo-curable resin solution 7 is bonded firmly both to the box or transparent vessel 4 and to the formed optical waveguide 1. That is, the optical waveguide 1 is firmly fixed to the box. Since the optical waveguide 1 is firmly fixed to the box through the second photo-curable resin solution 7, the optical waveguide device can be formed as a firm optical waveguide device which protects the optical waveguide steadily against impact such as fall impact.

(Second Embodiment)

In the first embodiment, the retention members are used for supporting the optical waveguide. However, optical components may be substituted for the retention members. That is, this embodiment shows an example in which each of the optical components is made to serve also as a retention member. In other words, the embodiment shows an example in which each of the optical components is made to have both an optical function and a support function. Further, in the first embodiment, a cleaning step is required when the first photo-curable resin solution 2 is exchanged for the second photo-curable resin solution 7. This embodiment shows an example in which the second photo-curable resin solution mutually soluble in the first photo-curable resin solution is used so that the cleaning step can be omitted, whereby the propagation loss can be further reduced.

Figure 3:
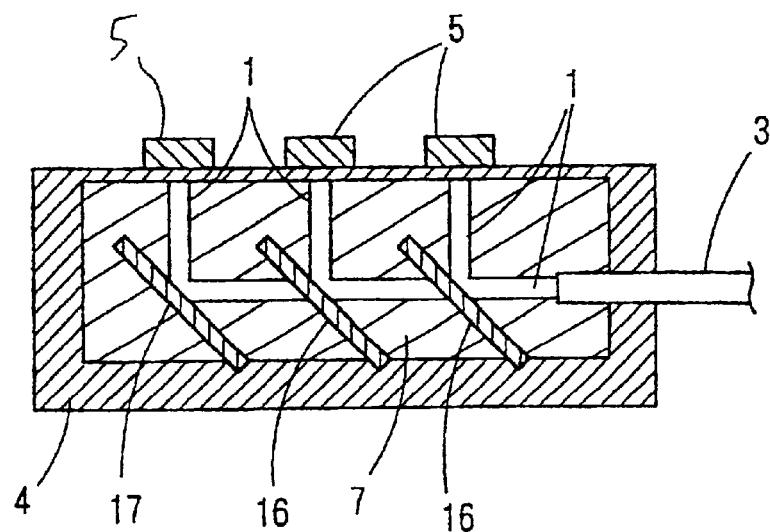
FIG. 3 is a sectional view showing an optically receiving device using an optical waveguide for wavelength multiplexing communication according to a second embodiment.

FIG. 3 is a sectional view showing an optically receiving device having an optical waveguide for use in wavelength multiplexing communication. This is an example in which half mirrors 16 and a totally reflecting mirror 17 are used instead of the retention members of the first embodiment so that the ratio of the quantity of transmission to the quantity of reflection is set to be a predetermined value. In order to produce such an optical waveguide device, in the step FIG. 5A, the half mirrors 16 and the totally reflecting mirror 17 are provided erectly at a predetermined angle such as 45° in a path which forms a self-forming waveguide. Thereafter, a first photo-curable resin solution 2 is injected and then the steps FIGS. 5A to 5C are carried out. On this occasion, in the step FIG. 5A, it is preferable that light of a predetermined wavelength for axial alignment (for example, a laser beam of a wavelength 633 nm) is used to adjust the positional relation between each of the half mirrors 16 and corresponding one of optical sensors 5 and the positional relation between the totally reflecting mirror 17 and a corresponding optical sensor 5 in advance. For example, the positions of the optical sensors 5 are adjusted so that the outputs of the optical sensors 5 are maximized. When adjustment is made in such a manner, an optical waveguide 1 always reaches the optical sensors 5. Then, the process shifts to the steps FIGS. 5B and 5C sequentially. In the step FIG. 5C, a cleaning step is not carried out, and in the step FIG. 5D, a second photo-curable resin solution 7 mutually soluble in the first photo-curable resin solution 2 is injected and solidified by ultraviolet rays 9.

Incidentally, the optical sensors 5 are made to have filters for selecting various wavelengths respectively, and the optical sensors 5 are provided externally on a transparent box 4, as shown in FIG. 3.

The second photo-curable resin solution 7 mutually soluble in the first photo-curable resin solution 2 is used in the step FIG. 5D for the purpose of preventing increase in cost as follows. In the step FIG. 5C, a cleaning step using a solvent is effective in perfectly removing the uncured part of the first photo-curable resin solution 2. The cleaning step FIG. 5C, however, brings increase in cost.

Further, the cleaning step is not provided for perfectly removing the first photo-curable resin solution 2. That is, a part of the first photo-curable resin solution 2 remains on the surface of the optical waveguide. This will cause increase in propagation loss. In order to avoid increase in propagation loss, in the embodiment, a resin liquid highly mutually soluble in the first photo-curable resin solution 2 is used as the second photo-curable resin solution 7.

Upon selection of the mutually soluble resin, as described in detail in the paper "Adhesive Handbook (second version)" (the Adhesion Society of Japan, p. 19, 1980), a solution having a parameter near solubility parameter or an interaction factor of not larger than 0.55 is generally selected. When the parameter near solubility parameter or the interaction factor is not larger than 0.55, light scatter caused by phase separation is not observed because the two solutions are mixed with each other in a molecular level. In an example in which an acrylic resin is used as the first photo-curable resin solution 2 (a photo-curable resin solution for the core), an acrylic resin, an epoxy resin, an oxetane resin or a silicone resin can be used as the second photo-curable resin solution 7 (a photo-curable resin solution for the clad material).

When any one of these resin liquids is used as the second photo-curable resin solution 7, the uncured part of the first photo-curable resin solution 2 deposited and remaining on the surface of the optical waveguide 1 is dissolved in the second photo-curable resin solution 7. As a result, a sudden change of the refractive index is produced in the boundary surface between the core (first photo-curable resin solution which is cured) and the clad (second photo-curable resin solution which is cured). That is, a more perfect step-index optical waveguide can be achieved, so that an optical waveguide device with lower loss can be formed. The mutually soluble resin can be used also for the first embodiment.

Further, in order to grow the self-forming optical waveguide 1 along the direction of traveling of the light in the steps FIGS. 5A to 5C, the optical waveguide 1 is formed to reach the respective optical sensors 5 while the path of the optical waveguide 1 branches into two by reflection and transmission of the half mirrors 16. Further, the path of the optical waveguide is changed by 90° by the totally reflecting mirror 17 so as to reach the corresponding optical sensor 5. Also in this case, the optical waveguide 1 has at least two bonded points including points at the opposite ends, so that the optical waveguide 1 has a firm structure.

Incidentally, in the embodiment, because the half mirrors 16 are used, all pieces of the information are inputted to the respective optical sensors 5. As described above, the optical sensors 5 have not-shown filters respectively, so that pieces of information by wavelength (bandwidth) are received by the optical sensors respectively.

Further, each of the half mirrors 16 may be a half mirror such as a wavelength selective interference filter. In addition to improvement in stability of the self-forming optical waveguide, highly functional communication devices such as an optical communication device for wavelength multiplexing communication and a two-way communication device can be manufactured.

(Third Embodiment)

Figure 4:
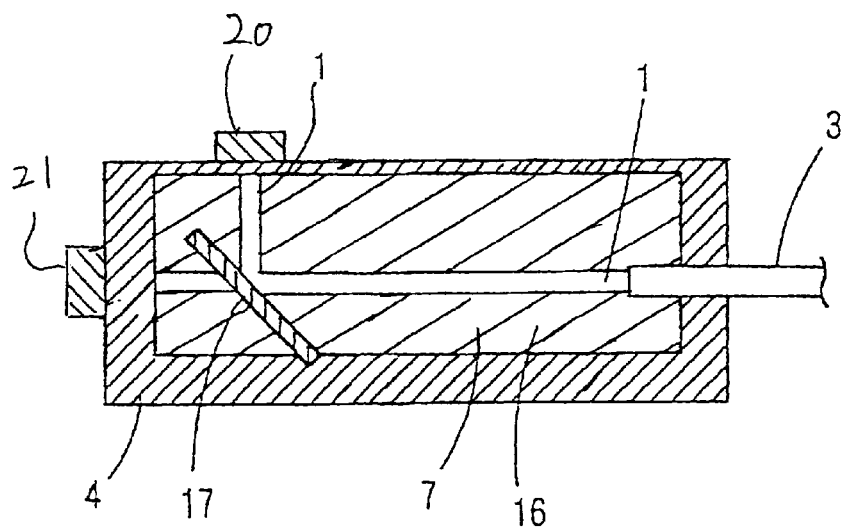
FIG. 4 is a sectional view showing an optically receiving device using an optical waveguide for wavelength multiplexing communication according to a third embodiment.

FIG. 4 is a sectional view showing an optically receiving device according to a third embodiment. In the second embodiment, two optical sensors 20, 21 and one reflecting mirror 17 are attached on and in the transparent vessel 4. One optical sensor 20 is attached on the upper side of the vessel 5 as the optical sensors 5 in the second embodiment but another optical sensor 21 is attached on the lateral side of the vessel 5. Other structures are same as those in the second embodiment.

As aforementioned, the optical sensors 5, 20 and 21 can be optionally replaced by another type of the optical component such as a light emitting element including a semiconductor laser, an LED, or the like.

(Modification)

Although the embodiments of the invention have been described above, various modifications may be conceived. For example, though the first embodiment has shown the case where a helium-cadmium laser beam ($\lambda$=325 nm) is used as the laser beam of a short wavelength, the invention may be applied also to the case where an argon ion laser ($\lambda$=488 nm) or an ultrahigh pressure mercury lamp ($\lambda$=380 nm) is used in accordance with the photo-curable resin solution.

Further, though the first and second embodiments have shown the case where the optical fiber 3 is fixed into the transparent box 4 while the optical fiber 3 penetrates the transparent box 4, the invention may be applied also to the case where the optical fiber 3 does not penetrate the transparent box 4. Because the box 4 is transparent, the optical fiber 3 may be fixed externally onto the transparent box 4. In this case, the optical waveguide 1 is extended from the internal side of the transparent box 4 with the same effect.

Further, though the first and second embodiments have shown the case where the second photo-curable resin solution 7 is injected into the transparent vessel 4 and solidified by the ultraviolet rays 9 for solidification as a whole, the invention may be applied also to the case where a heat-curable resin is used in place of the second photo-curable resin solution 7. In this case, heating may be used in place of irradiation with ultraviolet rays 9. Because it is unnecessary to use the transparent vessel formed from optical glass or the like, manufacturing can be carried out at low cost. Incidentally, when an opaque vessel made of metal or the like is used, the optical components such as optical sensors may be provided inside the vessel, or holes may be formed in the opaque vessel so that the optical waveguide can be connected to the optical sensors directly. Also in this case, the same effect can be obtained.

Further, though the kind of the optical fiber is not specified in the first and second embodiments, both a step-index optical fiber and a graded-index optical fiber may be used. Any one of these optical fibers may be used.

Further, the present invention is not limited to the above-mentioned embodiments. It can be carried out in various modes without departing from the scope of the invention.

What is claimed is:

1. A method of manufacturing an optical waveguide device provided with an optical waveguide, said optical waveguide being continuously formed by curing a first photo-curable resin in a direction of an optical axis with light of a predetermined wavelength guided into said first photo-curable resin liquid, wherein said method comprises:
preparing an optical fiber for guiding said light into a box of said optical waveguide device filled with said first photo-curable resin liquid, and fixing said optical fiber to said box;
curing said first photo-curable resin liquid along an optical path of said light by said light outputted from said optical fiber, and making a forward end of said optical path abut on said box to thereby fix a forward end of said cured first photo-curable resin liquid to said box;

thereafter, removing an uncured portion of said first photo-curable resin liquid from said box; and filling said box with a second photo-curable resin liquid, and curing said second photo-curable resin liquid so that said cured second photo-curable resin liquid has a refractive index lower than that of said cured first photo-curable resin liquid, wherein at least one retention member transparent or reflective to said light is provided in said box in a state that said retention member is fixed to said box, so that said optical waveguide is bonded to said retention member when said first photo-curable resin liquid is cured.

2. A method of manufacturing an optical waveguide device according to claim 1, wherein said light is guided through said optical fiber fixed to said box, so that when said optical fiber is fixed externally onto said box, said optical waveguide is formed so as to be continued from an inner wall of said box corresponding to the forward end of said optical fiber.

3. A method of manufacturing an optical waveguide device according to claim 1, wherein said first photo-curable resin liquid comprises a resin liquid having an adhesive property to said box when said first photo-curable resin liquid is cured.

4. A method of manufacturing an optical waveguide device according to claim 1, wherein said first photo-curable resin liquid comprises a resin liquid having an adhesive property to said retention member when said first photo-curable resin liquid is cured.

5. A method of manufacturing an optical waveguide device according to claim 1, wherein said second photo-curable resin liquid comprises a resin liquid having an adhesive property to said box when said second photo-curable resin liquid is cured.

6. A method of manufacturing an optical waveguide device according to claim 1, wherein said second photo-curable resin liquid has an adhesive property to said first photo-curable resin which is cured.

7. A method of manufacturing an optical waveguide device according to claim 1, wherein said second photo-curable resin liquid is mutually soluble in said first photo-curable resin liquid.

8. A method of manufacturing an optical waveguide device according to claim 1, wherein said second photo-curable resin liquid comprises at least one of a photo-curable resin and a heat-curable resin.

9. A method of manufacturing an optical waveguide device according to claim 3, wherein said first photo-curable resin liquid comprises a silane coupling additive to provide said adhesive property.

10. A method of manufacturing an optical waveguide device according to claim 5, wherein said second photo-curable resin liquid comprises a silane coupling additive to provide said adhesive property.

11. A method of manufacturing an optical waveguide device according to claim 1, wherein said at least one retention member comprises a transparent planar plate.

12. A method of manufacturing an optical waveguide device according to claim 11, wherein said at least one retention member comprises a plurality of parallel transparent planar plates.

13. A method of manufacturing an optical waveguide device according to claim 1, wherein said at least one retention member comprises transparent glass.

14. A method of manufacturing an optical waveguide device according to claim 9, wherein said silane coupling additive comprises an alkoxyl group-containing polymer formed from polysiloxane comprising at least one of an acrylic group, an amino group, an isocyanate group and a vinyl group.

15. A method of manufacturing an optical waveguide device according to claim 10, wherein said silane coupling additive comprises an alkoxyl group-containing polymer formed from polysiloxane comprising at least one of an acrylic group, an amino group, an isocyanate group and a vinyl group.

16. A method of manufacturing an optical waveguide device according to claim 1, further comprising applying an adhesive agent onto said at least one retention member.

17. A method of manufacturing an optical waveguide device according to claim 1, wherein said at least one retention member comprises an optical component.

18. A method of manufacturing an optical waveguide device according to claim 17, wherein said optical components comprise two half mirrors and a totally reflecting mirror, said mirrors being provided at a predetermined angle.

19. A method of manufacturing an optical waveguide device according to claim 1, wherein said light is guided through said optical fiber fixed to said box, so that when said optical fiber is fixed into said box while said optical fiber penetrates said box, said optical waveguide is formed so as to be continued from the forward end of said optical fiber.

* * * * *